United States Patent
Broede et al.

(10) Patent No.: US 9,697,079 B2
(45) Date of Patent: Jul. 4, 2017

(54) PROTECTING DATA INTEGRITY IN DE-DUPLICATED STORAGE ENVIRONMENTS IN COMBINATION WITH SOFTWARE DEFINED NATIVE RAID

(71) Applicant: International Business Machines Corporation, Armonk, NY (US)

(72) Inventors: Frank Broede, Loerzweiler (DE); Michael Diederich, Mainz (DE); Monty C. Poppe, Austin, TX (US); Erik Rueger, Ockenheim (DE); Lance W. Russell, Rosanky, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/797,368

(22) Filed: Jul. 13, 2015

(65) Prior Publication Data

US 2017/0017547 A1    Jan. 19, 2017

(51) Int. Cl.
*G06F 11/00* (2006.01)
*G06F 11/10* (2006.01)
*G06F 3/06* (2006.01)

(52) U.S. Cl.
CPC .......... *G06F 11/1076* (2013.01); *G06F 3/064* (2013.01); *G06F 3/0619* (2013.01); *G06F 3/0641* (2013.01); *G06F 3/0689* (2013.01)

(58) Field of Classification Search
CPC .. G06F 11/1076; G06F 3/0641; G06F 3/0619; G06F 3/064; G06F 3/0689; G06F 2211/1002–2211/1095
See application file for complete search history.

(56) References Cited

U.S. PATENT DOCUMENTS

| 7,870,105 B2 | 1/2011 | Arakawa et al. |
| 8,407,191 B1 | 3/2013 | Nanda |
| 8,612,699 B2 | 12/2013 | Jain et al. |

(Continued)

FOREIGN PATENT DOCUMENTS

| CN | 102968279 A | 3/2013 |
| CN | 104267913 A | 1/2015 |

(Continued)

OTHER PUBLICATIONS

List of IBM Patents or Patent Applications Treated as Related (Appendix P), 2 pages.

(Continued)

*Primary Examiner* — Jason Bryan
(74) *Attorney, Agent, or Firm* — Stephen R. Tkacs; Stephen J. Walder, Jr.; Randall J. Bluestone

(57) ABSTRACT

A mechanism is provided in a data processing system for securing data integrity in de-duplicated storage environments in combination with software defined native redundant array of independent disks (RAID). The mechanism receives a data portion to write to storage, divides the data portion into a plurality of chunks, and identifies a given chunk within the plurality of chunks for de-duplication. The mechanism increment a de-duplication counter for the given chunk and determines a RAID level for the given chunk based on a value of the de-duplication counter. The mechanism stores the given chunk based on the determined RAID level.

20 Claims, 5 Drawing Sheets

(56) References Cited

U.S. PATENT DOCUMENTS

| | | | |
|---|---|---|---|
| 8,631,201 B2 | 1/2014 | Koshiyama | |
| 8,793,467 B2 | 7/2014 | Colgrove et al. | |
| 8,892,527 B1 | 11/2014 | Yadav et al. | |
| 9,037,794 B2 | 5/2015 | Nolterieke et al. | |
| 2010/0037118 A1* | 2/2010 | Saliba | G06F 3/0608 |
| | | | 714/752 |
| 2010/0281207 A1* | 11/2010 | Miller | G06F 3/0608 |
| | | | 711/103 |
| 2011/0055471 A1 | 3/2011 | Thatcher et al. | |
| 2014/0317447 A1 | 10/2014 | Colgrove et al. | |
| 2016/0179395 A1* | 6/2016 | Fisher | G06F 3/0608 |
| | | | 711/103 |

FOREIGN PATENT DOCUMENTS

| | | |
|---|---|---|
| EP | 2834768 A1 | 2/2015 |
| GB | 2472072 A | 1/2011 |
| WO | WO 2013/151732 | 1/2011 |

OTHER PUBLICATIONS

"Identifying the Hidden Risk of Data Deduplication: How the HYDRAstor Solution Proactively Solves the Problem", NEC Corporation of America, White Paper, Jan. 7, 2008, 9 pages.

"Smarter Method to Achieve Multi-tenancy at the RAID Level", Disclosed Anonymously, www.ip.com, IPCOM000204434D, Feb. 24, 2011, 6 pages.

Du, Yimo, "R-Dedup: Content Aware Redundancy Management for SSD-Based RAID Systems", 2014 43rd International Conference on Parallel Processing (ICPP-2014), Sep. 9-12, 2014, Minneapolis, MN, USA, 10 pages.

Nam, Youngjin et al., "Reliability-Aware Deduplication Storage: Assuring Chunk Reliability and Chunk Loss Severity", IGCC '11 Proceedings of the 2011 International Green Computing Conference and Workshops, Jul. 25-28, 2011, 6 pages.

Yoon, Doe H. et al., "The Dynamic Granularity Memory System", IEEE Computer Society, ACM SIGARCH Computer Architecture News, vol. 40, No. 3, Jun. 2012, pp. 548-559.

\* cited by examiner

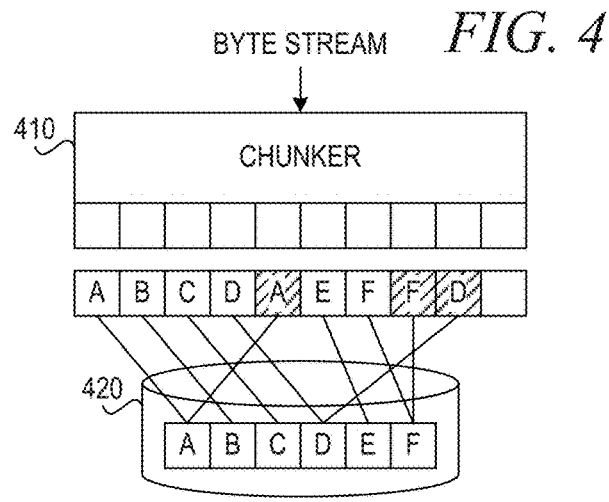
FIG. 4
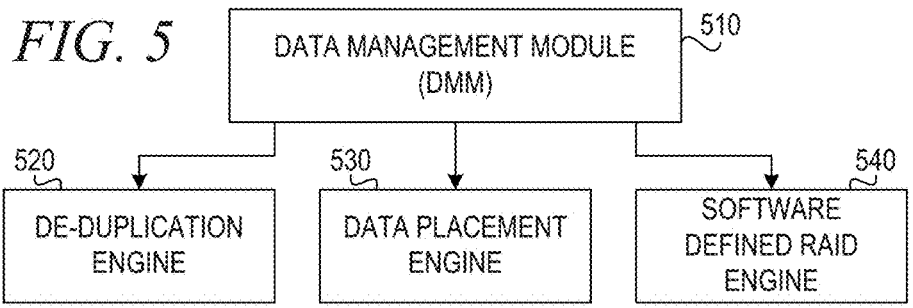
FIG. 5
FIG. 6
| DEDUPLICATION NUMBER | RAID LEVEL |
|---|---|
| 0 – 1,000 | 5 |
| 1,000 – 10,000 | 6 |
| 10,000 - 100,000 | 10 |
| 100,000 - N | 1 |
FIG. 7
| DEDUPLICATION NUMBER | RAID LEVEL | PERFORMANCE LEVEL |
|---|---|---|
| 0 – 1,000 | 5 | LOW |
| 1,000 – 10,000 | 6 | MEDIUM |
| 10,000 - 100,000 | 10 | MEDIUM |
| 100,000 - N | 1 | HIGH |

PROTECTING DATA INTEGRITY IN DE-DUPLICATED STORAGE ENVIRONMENTS IN COMBINATION WITH SOFTWARE DEFINED NATIVE RAID

BACKGROUND

The present application relates generally to an improved data processing apparatus and method and more specifically to mechanisms for protecting data integrity in de-duplicated storage environments in combination with software defined native RAID.

RAID (redundant array of independent disks) is a data storage virtualization technology that combines multiple disk drive components into a single logical unit for the purposes of data redundancy or performance improvement. RAID systems distribute data across the drives in one of several ways, referred to as RAID levels, depending on the specific level of redundancy and performance required.

A number of standard schemes have evolved. These are called levels. Originally, there were five RAID levels, but many variations have evolved—notably several nested levels and many non-standard levels. RAID levels and their associated data formats are standardized by the Storage Networking Industry Association (SNIA) in the Common RAID Disk Drive Format (DDF) standard:

RAID 0 consists of striping, without mirroring or parity. The capacity of a RAID 0 volume is the sum of the capacities of the disks in the set, the same as with a spanned volume. There is no added redundancy for handling disk failures, just as with a spanned volume. Thus, failure of one disk causes the loss of the entire RAID 0 volume, with reduced possibilities of data recovery when compared to a broken spanned volume. Striping distributes the contents of files roughly equally among all disks in the set, which makes concurrent read or write operations on the multiple disks almost inevitable and results in performance improvements. The concurrent operations make the throughput of most read and write operations equal to the throughput of one disk multiplied by the number of disks. Increased throughput is the big benefit of RAID 0 versus spanned volume.

RAID 1 consists of data mirroring, without parity or striping. Data is written identically to two or more drives, thereby producing a "mirrored set" of drives. Thus, any read request can be serviced by any drive in the set. If a request is broadcast to every drive in the set, it can be serviced by the drive that accesses the data first (depending on seek time and rotational latency), improving performance. Sustained read throughput, if the controller or software is optimized for it, approaches the sum of throughputs of every drive in the set, just as for RAID 0. Actual read throughput of most RAID 1 implementations is slower than the fastest drive. Write throughput is always slower because every drive must be updated, and the slowest drive limits the write performance. The array continues to operate as long as at least one drive is functioning.

RAID 5 consists of block-level striping with distributed parity. RAID 5 requires that all drives but one be present to operate. Upon failure of a single drive, subsequent reads can be calculated from the distributed parity such that no data are lost. RAID 5 requires at least three disks.

RAID 6 consists of block-level striping with double distributed parity. Double parity provides fault tolerance up to two failed drives. This makes larger RAID groups more practical, especially for high-availability systems, as large-capacity drives take longer to restore. RAID 6 requires a minimum of four disks. As with RAID 5, a single drive failure results in reduced performance of the entire array until the failed drive has been replaced. With a RAID 6 array, using drives from multiple sources and manufacturers, it is possible to mitigate most of the problems associated with RAID 5. The larger the drive capacities and the larger the array size, the more important it becomes to choose RAID 6 instead of RAID 5.

RAID 1+0, also referred to as RAID 10, creates a striped set from a series of mirrored drives. The array can sustain multiple drive losses so long as no mirror loses all its drives.

Software RAID implementations are now provided by many operating systems. Software RAID can be implemented as a layer that abstracts multiple devices, thereby providing a single virtual device, a more generic logical volume manager, a component of the file system, or a layer that sits above any file system and provides parity protection to user data. Some advanced file systems are designed to organize data across multiple storage devices directly without needing the help of a third-party logical volume manager. The General Parallel File System (GPFS), initially developed by IBM for media streaming and scalable analytics, supports de-clustered RAID protection schemes up to n+3. A particularity is the dynamic rebuilding priority which runs with low impact in the background until a data chunk hits n+0 redundancy, in which case this chunk is quickly rebuilt to at least n+1. On top, GPFS supports metro-distance RAID 1.

In computing, data deduplication is a specialized data compression technique for eliminating duplicate copies of repeating data. This technique is used to improve storage utilization and can also be applied to network data transfers to reduce the number of bytes that must be sent. In the deduplication process, unique chunks of data, or byte patterns, are identified and stored during a process of analysis. As the analysis continues, other chunks are compared to the stored copy and whenever a match occurs, the redundant chunk is replaced with a small reference that points to the stored chunk. Given that the same byte pattern may occur dozens, hundreds, or even thousands of times (the match frequency is dependent on the chunk size), the amount of data that must be stored or transferred can be greatly reduced.

SUMMARY

In one illustrative embodiment, a method, in a data processing system, is provided for securing data integrity in de-duplicated storage environments in combination with software defined native redundant array of independent disks (RAID). The method comprises receiving a data portion to write to storage, dividing the data portion into a plurality of chunks, and identifying a given chunk within the plurality of chunks for de-duplication. The method further comprises incrementing a de-duplication counter for the given chunk and determining a RAID level for the given chunk based on a value of the de-duplication counter. The method further comprises storing the given chunk based on the determined RAID level.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 depicts storage with data de-duplication in accordance with an illustrative embodiment;

FIG. 5 is a block diagram of a software defined RAID data management module in accordance with an illustrative embodiment;

FIG. 6 shows an example mapping of predefined RAID levels for numbers of de-duplications in accordance with an illustrative embodiment;

FIG. 7 shows an example mapping of predefined performance levels for numbers of de-duplications in accordance with an illustrative embodiment.

DETAILED DESCRIPTION

Figure 1:
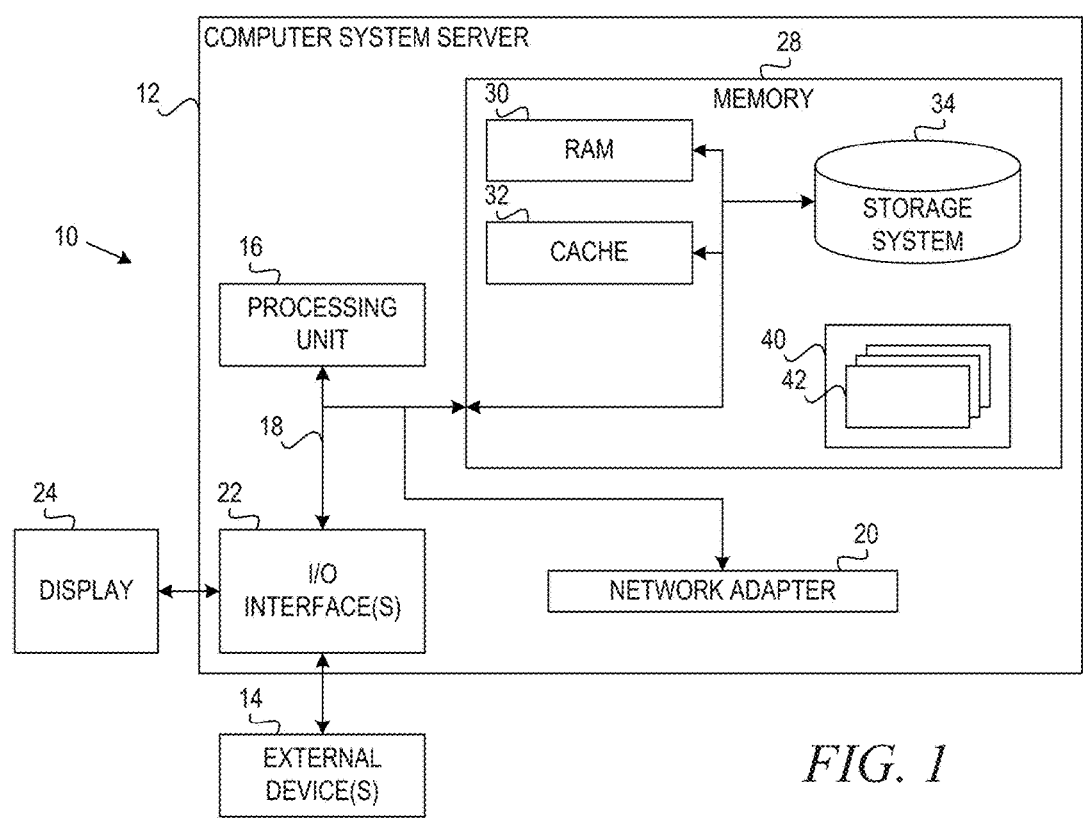
FIG. 1 depicts a cloud computing node according to an illustrative embodiment.

The illustrative embodiments provide mechanisms for protecting data integrity in de-duplicated storage environments in combination with software defined native RAID. The illustrative embodiments provide mechanisms for dynamic creation and data placement on different RAID protection levels. The illustrative embodiments place highly important data, i.e., highly de-duplicated data, on higher RAID levels and to place less important data, i.e., less de-duplicated data, on lower RAID levels within an acceptable level of investment for data protection. In other embodiments, mechanisms perform dynamic data placement between different performance pools.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a locus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media. in the form of volatile memory, such as random access memory (RAM) 30 and/or cache memory 32. Computer system/server 12 may further include other removable/non -removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
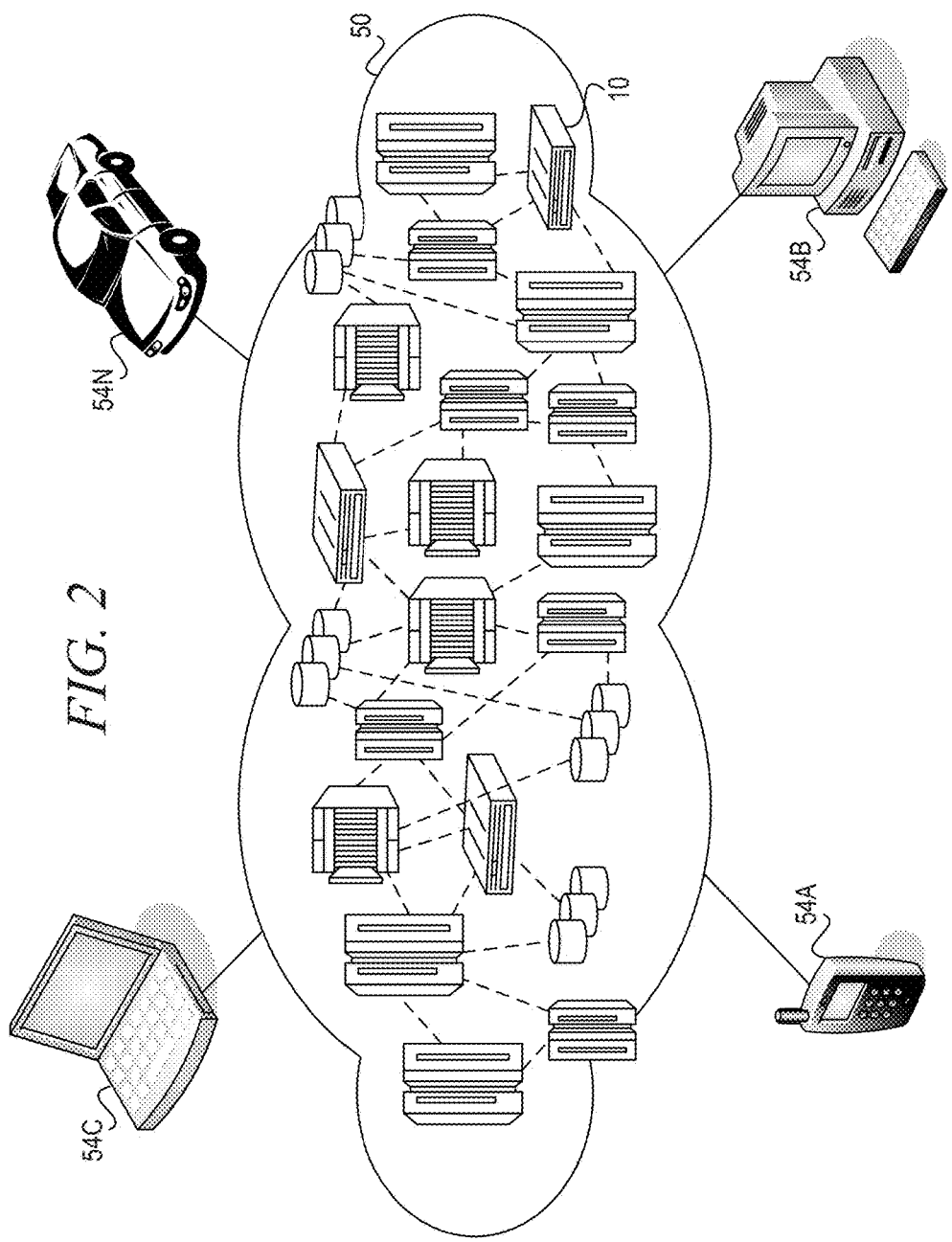
FIG. 2 depicts a cloud computing environment according an illustrative embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
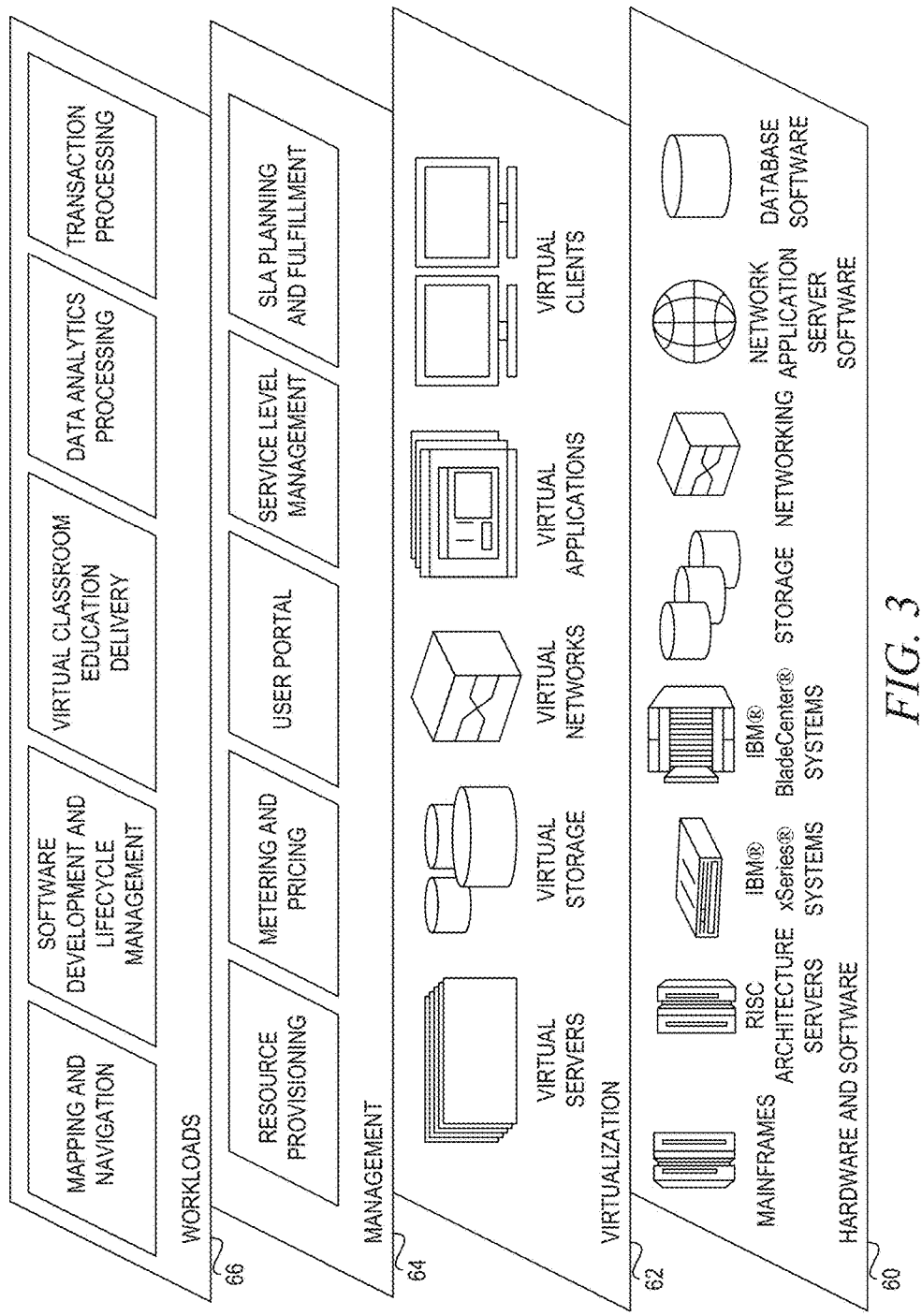
FIG. 3 depicts abstraction model layers according to an illustrative embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; and data analytics processing; transaction processing.

FIG. 4 depicts storage with data de-duplication in accordance with an illustrative embodiment. The amount of digitally stored information is dramatically increasing. Recent studies estimate that this growth will continue by a factor of approximately 40 within the next ten years. In order to mitigate this dramatic growth, one may use data de-duplication methods to eliminate or reduce the amount of duplicated data.

As shown in FIG. 4, chunker 410 is an algorithm executing as software in a host or as software or firmware in a storage controller. Chunker 410 receives a byte stream of data to be written to storage 420 and divides the byte stream into chunks. The byte stream may comprise files or blocks of data, for example. A chunk may be a file, a block, multiple blocks, etc. The chunks may be a fixed or variable size.

Chunker 410 determines an identity characteristic for each chunk. Chunker 410 may determine the identity using a hash function, for example.

When chunker 410 identifies an incoming block as a duplicate of a previously stored block, the de-duplication algorithm adds only a pointer to the previously physically stored block to the respective metadata. The de-duplication algorithm stores non-identical chunks to physical storage 420. The de-duplication algorithm may also use compression when storing a chunk to physical storage 420.

In case of corruption or disk failure, the toss of data is magnified by the level of de-duplication. That is, when a chunk of data in physical storage 420 is compromised, every chunk referencing the physically stored chunk is also compromised. The better the de-duplication ratio is, the higher are the chances for "rot data" incidents to impact larger numbers of files and deem them all corrupted or lost. "Rot data" is an incident where "bit flips" (from 1 to 0 or vice versa) occur spontaneously on the storage and, as such, destroy data integrity.

To protect data from corruption and disk failures, one may establish a storage system with RAID level 5. RAID (redundant array of independent disks) is a data storage virtualization technology that combines multiple disk drive components into a single logical unit for the purposes of data redundancy or performance improvement. RAID 5 consists of block-level striping with distributed parity. This is considered an acceptable level of investment for data integrity. Double disk errors not protected by RAID 5 result in a huge amount of corrupt or lost data.

RAID technology has grown from a server option to a data protection requirement. The first implementations of RAID in 1990 were very expensive controller boards with high performance input/output (I/O) processors that were as powerful as the host central processing unit (CPU). At that time, when hardware-based RAID solutions were the only option, the cost of a RAID controller limited the usage to high-priced servers. Today, RAID is found everywhere— from an operating system software feature to a stand-alone controller providing advanced data integrity in high-end storage area networks. RAID can be found in mobile environments such as laptops, as well as desktops, workstations, servers, and external enclosures with a large number of hard disk drives.

As an example, IBM® General Parallel File System (GPFS™) Native RAID is a software implementation of storage RAID technologies with GPFS. GPFS™ Native RAID integrates the functionality of an advanced storage controller into the GPFS Network Shared Disk (NSD) server. Unlike an external storage controller, where configuration, logical unit (LUN) definition, and maintenance are beyond the control of GPFS, GPFS Native RAID takes ownership of the disk array to directly match LUN definition, caching, and disk behavior to GPFS requirements. Sophisticated data placement and error correction algorithms deliver high levels of storage reliability, availability, serviceability, and performance.

The illustrative embodiments provide a mechanism to enhance the robustness of de-duplicated storage environments. The illustrative embodiments use dynamic data RAID level definition depending on the data de-duplication information for each data chunk. The illustrative embodiments combine the information of de-duplication into the sophisticated data placement engine within native RAID software implementations.

The higher the de-duplication ratio, the greater the probability that a large number of files are corrupted by a single chunk error or loss, e.g., when "bit flips" occur spontaneously on the storage device and destroy data integrity. Higher RAID levels can protect against these errors but they will require more storage. This runs counter to the purpose of de-duplication, which is to reduce the amount of required more storage.

In accordance with the illustrative embodiment, dynamic software defined RAID levels effectively address this contradiction by placing important data at a higher RAID level than less important data. The level of importance for a particular piece of data is determined from the de-duplication information. The illustrative embodiments combine the de-duplication engine with the sophisticated data placement engine of software defined RAID.

FIG. 5 is a block diagram of a software defined RAID data management module in accordance with an illustrative embodiment. Data management module (DMM) 510 manages the combination of de-duplication engine 520, data placement engine 530, and software defined RAID engine 540. DMM 510 captures information from de-duplication engine 520, such as the amount of de-duplication for each chunk. DMM 510 maps predefined thresholds on the amount of de-duplication pointers to predefined RAID levels. FIG. 6 shows an example mapping of predefined RAID levels for numbers of de-duplications in accordance with an illustrative embodiment. In the depicted example, chunks with zero to 1,000 de-duplications are mapped to RAID 5, chunks with 1,000 to 10,000 de-duplications are mapped to RAID 6, chunks with 10,000 to 100,000 de-duplications are mapped to RAID 10, and chunks with greater than 100,000 de-duplications are mapped to RAID 1. The thresholds and mappings shown in FIG. 6 are examples to illustrate the aspects of the illustrative embodiments, and other thresholds and mappings may be used within the spirit and scope of the illustrative embodiments.

In accordance with one embodiment, the predefined thresholds may be set through a configuration option of software defined RAID. DMM 510 provides the required RAID levels to software defined RAID engine 540, which creates the RAID configurations in physical storage. Data placement engine 530 places chunks into physical storage. Depending on the increase or decrease of de-duplication counters, which count the number of de-duplication pointers, data placement engine 530 migrates the data into the appropriate RAID levels provided by software defined RAID engine 540 depending on the predefined thresholds within DMM 510.

Thus, the illustrative embodiments dynamically place important data at high protection RAID levels with less important data placed at tower RAID levels. This results in significantly less storage being required to obtain the desired protection.

In addition, in accordance with one embodiment, DMM 510 dynamically adjusts the RAID levels and thresholds depending on data demand. Frequently accessed data would be protected at a higher RAID level as data loss will have a greater impact on the storage user.

Furthermore, in addition to the above, in one embodiment, DMM 510 defines performance levels for the different levels of de-duplication. Data placement engine 530 automatically migrates data to pre-defined performance pools. FIG. 7 shows an example mapping of predefined performance levels for numbers of de-duplications in accordance with an illustrative embodiment. In the depicted example, chunks with zero to 1,000 de-duplications are mapped to a low performance storage pool, chunks with 1,000 to 100,000 de-duplications are mapped to a medium performance storage pool, and chunks with greater than 100,000 de-duplications are mapped to a high performance storage pool. The thresholds and mappings shown in FIG. 7 are examples to illustrate the aspects of the illustrative embodiments, and other thresholds and mappings may be used within the spirit and scope of the illustrative embodiments.

As shown in FIG. 7, DMM 510 places less duplicated data in a slow storage pool, such as near line serial attached SCSI (small computer system interface) (SAS) drives, and highly duplicated data in a fast storage pool, such as solid state disk (SSD).

One or more of the above procedures could be present in any given instance of software defined RAID.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD -ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field -programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 8:
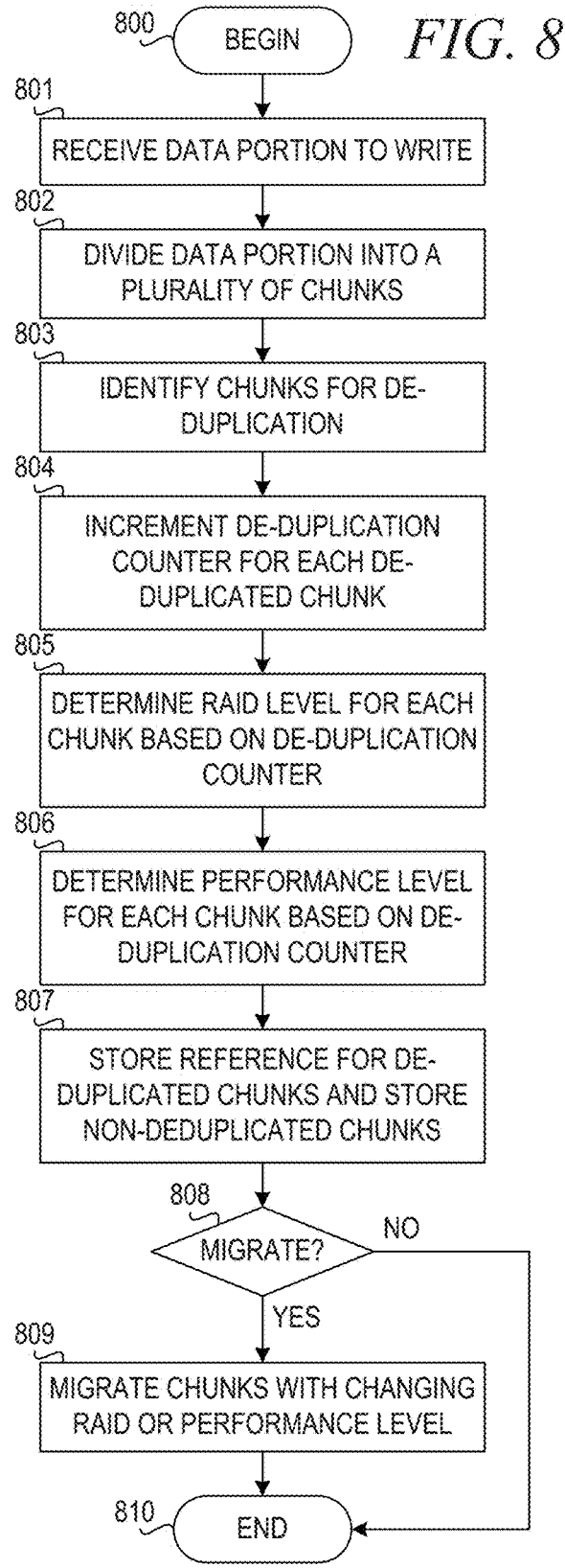
FIG. 8 is a flowchart illustrating operation of a data management module for securing data integrity in de-duplicated storage environments with software defined native RAID in accordance with an illustrative embodiment.

FIG. 8 is a flowchart illustrating operation of a data management module for securing data integrity in de-duplicated storage environments with software defined native RAID in accordance with an illustrative embodiment. Operation begins (block 800), and the data management module (DMM) receives a data portion to write to storage (block 801). A de-duplication engine divides the data portion into a plurality of chunks (block 802) and identifies chunks for de-duplication (block 803). The de-duplication engine increments a de-duplication counter for each de -duplicated chunk (block 804). The counter indicates a number of references to a previously stored chunk in physical storage or, in other words, a number of de -duplications for the chunk.

A software defined RAID engine of the DMM then determines a RAID level for each chunk based on a value of the de-duplication counter (block 805). In one embodiment, the DMM maintains a mapping of de-duplication thresholds to RAID levels and the software defined RAID engine compares the value of the de-duplication counter to the thresholds. For example, if the value of the de-duplication counter for a given chunk is less than 1,000, then the software defined RAID engine assigns RAID level 5 for the given chunk; if the value of the de-duplication counter for the given chunk is between 1,000 and 10,000, then the software defined RAID engine assigns RAID level 6 for the given chunk; if the value of the counter is between 10,000 and 100,000, then the software defined RAID engine assigns RAID level 10; and, if the value of the counter is greater than 100,000, then the software defined RAID engine assigns RAID level 1.

Also, in one embodiment, a data placement engine of the DMM determines a performance level for each chunk based on a value of the de-duplication counter (block 806). In one embodiment, the DMM maintains a mapping of de-duplication thresholds to performance levels and the data placement engine compares the value of the de-duplication counter to the thresholds. For example, if the value of the de-duplication counter for a given chunk is less than 1,000, then the data placement engine assigns a low performance level for the given chunk and assigns the chunk to a tow performance pool of storage; if the value of the de-duplication counter for the given chunk is between 1,000 and 100,000, then the data placement engine assigns a medium performance level for the given chunk; and, if the value of the counter is greater than 100,000, then the data placement engine assigns the given chunk to a high performance storage pool.

The DMM then stores a reference for each de-duplicated chunk and stores each non-de-duplicated chunk to storage (block 807). The DMM then determines whether one or more chunks are to be migrated to a different RAID level or a different performance pool based on a value of the de-duplication counter (block 808). For example, if the DMM increments a de-duplication counter for a given chunk in block 804 and the counter crosses a threshold, the DMM and the data placement engine migrate the chunk. If one or more chunks are to be migrated, the DMM and data placement engine migrate the one or more chunks with changing RAID and/or performance level (block 809). Thereafter, or if no chunks are to be migrated in block 808, operation ends (block 810).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams amid/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for securing data integrity in de-duplicated storage environments in combination with software defined native redundant array of independent disks (RAID), the method comprising:
   receiving a data portion to write to storage;
   dividing the data portion into a plurality of chunks;
   identifying a given chunk within the plurality of chunks for de-duplication;
   incrementing a de-duplication counter for the given chunk;
   determining a RAID level for the given chunk based on a value of the de-duplication counter; and
   storing the given chunk based on the determined RAID level.

2. The method of claim 1, wherein determining the RAID level for the given chunk comprises comparing the de-duplication counter to at least one threshold, wherein the at least one threshold are mapped to corresponding RAID levels.

3. The method of claim 2, wherein values of the de-duplication counter less than a first threshold are mapped to RAID 5, wherein values of the de-duplication counter greater than the first threshold and less than a second threshold are mapped to RAID 6, wherein values of the de-duplication counter greater than the second threshold and less than a third threshold are mapped to RAID 10, and wherein values of the de-duplication counter greater than the third threshold are mapped to RAID 1.

4. The method of 1, further comprising determining a performance level for the given chunk based on the value of the de-duplication counter, wherein storing the given chunk comprises storing the given chunk based on the determined RAID level and the determined performance level.

5. The method of claim 4, wherein storing the given chunk comprises storing a reference to a previously stored chunk in physical storage and migrating the previously stored chunk based on the determined RAID level.

6. The method of claim 4, wherein determining the performance level for the given chunk comprises comparing the de-duplication counter to at least one threshold, wherein the at least one threshold are mapped to corresponding RAID levels.

7. The method of claim 6, wherein values of the de-duplication counter less than a first threshold are mapped to a low performance pool of storage, wherein values of the de-duplication counter greater than the first threshold and less than a second threshold are mapped to a medium performance pool of storage, and wherein values of the de-duplication counter greater than the second threshold are mapped to a high performance pool of storage.

8. The method of claim 1, further comprising dynamically adjusting the RAID level of the given chunk based on data demand.

9. The method of claim 1, wherein storing the given chunk comprises storing a reference to a previously stored chunk in physical storage and migrating the previously stored chunk based on the determined RAID level.

10. A computer program product comprising a computer readable storage medium having a computer readable program stored therein, wherein the computer readable program, when executed on a computing device, causes the computing device to:
receive a data portion to write to storage;
divide the data portion into a plurality of chunks;
identify a given chunk within the plurality of chunks for de-duplication;
increment a de-duplication counter for the given chunk;
determine a RAID level for the given chunk based on a value of the de-duplication counter; and
store the given chunk based on the determined RAID level.

11. The computer program product of claim 10, wherein determining the RAID level for the given chunk comprises comparing the de-duplication counter to at least one threshold, wherein the at least one threshold are mapped to corresponding RAID levels.

12. The computer program product of claim 11, wherein values of the de-duplication counter less than a first threshold are mapped to RAID 5, wherein values of the de-duplication counter greater than the first threshold and less than a second threshold are mapped to RAID 6, wherein values of the de-duplication counter greater than the second threshold and less than a third threshold are mapped to RAID 10, and wherein values of the de-duplication counter greater than the third threshold are mapped to RAID 1.

13. The computer program product of 10, wherein the computer readable program further causes the computing device to determine a performance level for the given chunk based on the value of the de-duplication counter, wherein storing the given chunk comprises storing the given chunk based on the determined RAID level and the determined performance level.

14. The computer program product of claim 13, wherein storing the given chunk comprises storing a reference to a previously stored chunk in physical storage and migrating the previously stored chunk based on the determined RAID level.

15. The computer program product of claim 13, wherein determining the performance level for the given chunk comprises comparing the de-duplication counter to at least one threshold, wherein the at least one threshold are mapped to corresponding RAID levels.

16. The computer program product of claim 15, wherein values of the de-duplication counter less than a first threshold are mapped to a low performance pool of storage, wherein values of the de-duplication counter greater than the first threshold and less than a second threshold are mapped to a medium performance pool of storage, and wherein values of the de-duplication counter greater than the second threshold are mapped to a high performance pool of storage.

17. The computer program product of claim 10, wherein the computer readable program further causes the computing device to dynamically adjust the RAID level of the given chunk based on data demand.

18. The computer program product of claim 10, wherein storing the given chunk comprises storing a reference to a previously stored chunk in physical storage and migrating the previously stored chunk based on the determined RAID level.

19. An apparatus comprising:
a processor; and
a memory coupled to the processor, wherein the memory comprises instructions which, when executed by the processor, cause the processor to:
receive a data portion to write to storage;
divide the data portion into a plurality of chunks;
identify a given chunk within the plurality of chunks for de-duplication;
increment a de-duplication counter for the given chunk;
determine a RAID level for the given chunk based on a value of the de-duplication counter; and
store the given chunk based on the determined RAID level.

20. The apparatus of 19, wherein the computer readable program further causes the computing device to determine a performance level for the given chunk based on the value of the de-duplication counter, wherein storing the given chunk comprises storing the given chunk based on the determined RAID level and the determined performance level.

* * * * *